(12) United States Patent
Kimura et al.

(10) Patent No.: US 7,402,118 B2
(45) Date of Patent: Jul. 22, 2008

(54) CONTROL DEVICE FOR CONTROLLING V-BELT CONTINUOUSLY VARIABLE TRANSMISSION

(75) Inventors: Yusuke Kimura, Fuji (JP); Tatsuo Ochiai, Fuji (JP); Kenji Yoneda, Fuji (JP); Tateki Jozaki, Fuji (JP); Takeshi Chibahara, Fuji (JP); Jun Shiomi, Fuji (JP)

(73) Assignee: Jatco Ltd, Shizuoka (JP)

( * ) Notice: Subject to any disclaimer, the term of this patent is extended or adjusted under 35 U.S.C. 154(b) by 646 days.

(21) Appl. No.: 10/947,201

(22) Filed: Sep. 23, 2004

(65) Prior Publication Data
US 2005/0070402 A1 Mar. 31, 2005

(30) Foreign Application Priority Data
Sep. 30, 2003 (JP) .......................... P2003-340689

(51) Int. Cl.
*F16H 59/00* (2006.01)
*F16H 63/00* (2006.01)
*F16H 61/18* (2006.01)

(52) U.S. Cl. .............................. 474/18; 474/28; 477/37; 701/56

(58) Field of Classification Search .................. 474/18, 474/28; 477/37–50, 62, 141, 167; 701/56
See application file for complete search history.

(56) References Cited

U.S. PATENT DOCUMENTS

| 4,673,378 A | * | 6/1987 | Tokoro et al. .................. 474/18 |
| 5,067,603 A | * | 11/1991 | Kato et al. ..................... 477/39 |
| 5,713,815 A | | 2/1998 | Funatsu et al. | |

(Continued)

FOREIGN PATENT DOCUMENTS

JP 62-270855 A 11/1987

(Continued)

*Primary Examiner*—Marcus Charles
(74) *Attorney, Agent, or Firm*—Foley & Lardner LLP

(57) ABSTRACT

A control device for controlling a continuously variable transmission (5) is disclosed. The control device has an oil pressure control unit (100) which supplies an oil pressure to a primary pulley (10) and secondary pulley (11) based on a command signal indicative of a target speed-reduction ratio, a sensor (26) which detects a rotation speed (Np1) of the primary pulley (26), and a controller (20) which transmits the command signal indicative of the target speed-reduction ratio to the oil pressure control unit (100). The controller is programmed to set the target speed-reduction ratio to a first speed-reduction ratio (R1); calculate a first predetermined rotation speed (N1) of the primary pulley at which the V-belt reaches a first limiting temperature (T1) at the first speed-reduction ratio (R1); calculate a first elapsed time after the detected rotation speed (Np1) of the primary pulley exceeds the first predetermined rotation speed (N1); maintain the first speed-reduction ratio (R1) when the first elapsed time is equal to or less than a first predetermined time; and set the target speed-reduction ratio to a second speed-reduction ratio (R2) smaller than the first speed-reduction ratio (R1) when the first elapsed time exceeds the first predetermined time. At the second speed-reduction ratio (R2), the temperature of the V-belt should become equal to or less than the first limiting temperature (T1) throughout the permitted rotation speed region of the primary pulley. Thus, starting acceleration performance of the continuously variable transmission is enhanced.

10 Claims, 3 Drawing Sheets

U.S. PATENT DOCUMENTS

| | | | |
|---|---|---|---|
| 6,547,691 B2 * | 4/2003 | Hino | 477/37 |
| 7,041,018 B2 * | 5/2006 | Ochiai et al. | 474/28 |
| 7,211,013 B2 * | 5/2007 | Watanabe et al. | 474/18 |
| 2003/0032513 A1 * | 2/2003 | Aoyama | 474/242 |
| 2004/0063523 A1 * | 4/2004 | Jozaki et al. | 474/18 |
| 2004/0092344 A1 * | 5/2004 | Watanabe et al. | 474/18 |
| 2004/0116219 A1 * | 6/2004 | Watanabe et al. | 474/18 |

FOREIGN PATENT DOCUMENTS

| | | | |
|---|---|---|---|
| JP | 62-286847 A | | 12/1987 |
| JP | 9-026021 A | | 1/1997 |
| JP | 09014362 A | * | 1/1997 |

* cited by examiner

CONTROL DEVICE FOR CONTROLLING V-BELT CONTINUOUSLY VARIABLE TRANSMISSION

FIELD OF THE INVENTION

This invention relates to the controller of a continuously variable transmission, in particular, a V-belt continuously variable transmission.

BACKGROUND OF THE INVENTION

Tokkai Sho 62-270855 published by the Japanese Patent Office in 1987 discloses a prior art for suppressing heat generation of a V-belt. The controller of the prior art comprises a non-contact temperature sensor at a predetermined position between a drive pulley and a driven pulley, and the non-contact temperature sensor detects the radiant heat from the V-belt. When a state where the temperature of the V-belt exceeds a predetermined limiting temperature continues for a predetermined time, the controller controls a speed-reduction ratio to suppress heat generation by the V-belt.

SUMMARY OF THE INVENTION

However, since the controller of the prior art detects the temperature of the V-belt using a temperature sensor, it is costly. Further, as the controller detects the temperature of the V-belt indirectly from the heat radiated by the V-belt, a delay occurs in detecting the temperature rise of the V-belt, and the temperature detected by the controller is lower than the actual temperature of the V-belt. Hence, the precision of speed-reduction ratio control is low.

It is therefore an object of this invention to control the temperature characteristics of a V-belt with high precision, to extend the usage range of the speed-reduction ratio at low output speed, and improve the starting acceleration performance of a vehicle.

In order to achieve the above object, this invention provides a control device for controlling a continuously variable transmission. The continuously variable transmission has a primary pulley and secondary pulley with a V-belt looped around the pulleys. The control device comprises an oil pressure control unit which supplies an oil pressure to the primary pulley and secondary pulley based on a command signal indicative of a target speed-reduction ratio, a sensor which detects a rotation speed of the primary pulley, and a controller which transmits the command signal indicative of the target speed-reduction ratio to the oil pressure control unit.

The controller is programmed to set the target speed-reduction ratio to a first speed-reduction ratio; calculate a first predetermined rotation speed of the primary pulley at which the V-belt reaches a first limiting temperature at the first speed-reduction ratio; compare the detected rotation speed of the primary pulley with the first predetermined rotation speed; calculate a first elapsed time after the detected rotation speed of the primary pulley exceeds the first predetermined rotation speed; maintain the first speed-reduction ratio when the first elapsed time is equal to or less than a first predetermined time; and set the target speed-reduction ratio to a second speed-reduction ratio smaller than the first speed-reduction ratio when the first elapsed time exceeds the first predetermined time. At the second speed-reduction ratio, the temperature of the V-belt should become equal to or less than the first limiting temperature throughout the permitted rotation speed region of the primary pulley.

The details as well as other features and advantages of this invention are set forth in the remainder of the specification and are shown in the accompanying drawings.

BRIEF DESCRIPTION OF THE DRAWINGS

FIG. 2 shows a shift map displaying speed change curves of the continuously variable transmission.

DESCRIPTION OF THE PREFERRED EMBODIMENTS

Figure 1:
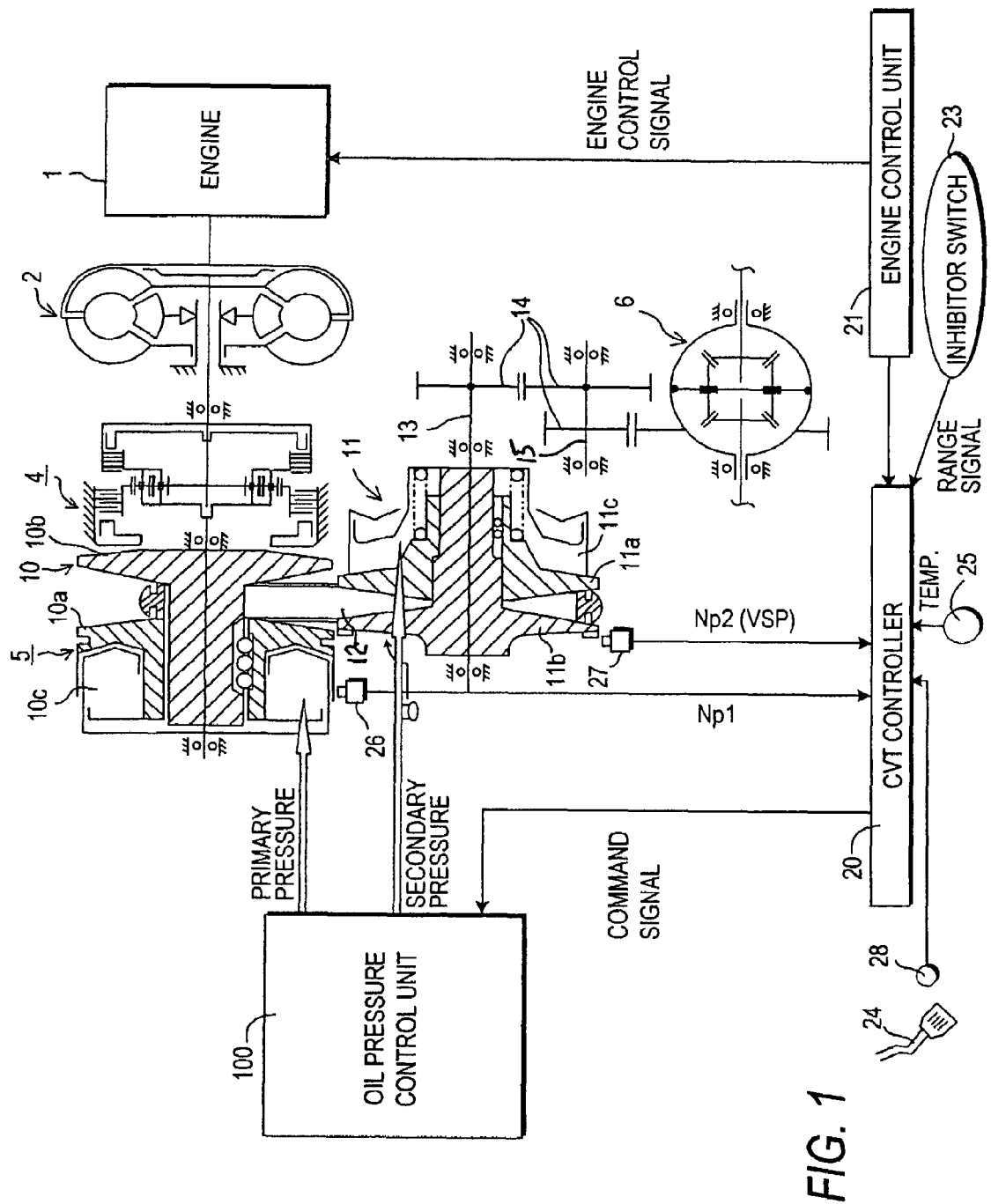
FIG. 1 is a schematic view of a continuously variable transmission installed in a vehicle.

FIG. 1 shows a continuously variable transmission 5 installed in a vehicle, and a control device of the continuously variable transmission 5. Referring to FIG. 1, the continuously variable transmission 5 is connected to an engine 1 via a torque converter 2 with a lock-up clutch and a forward-reverse change-over mechanism 4. The continuously variable transmission 5 comprises a primary pulley 10 (drive pulley) on the input side and a secondary pulley 11 (driven pulley) connected with an output shaft 13 as a pair of variable pulleys. The primary pulley 10 and the secondary pulley 11 are connected by a V-belt 12. The output shaft 13 is connected with a differential 6 via an idler gear 14 and an idler shaft 15.

An oil pressure control unit 100 controls a speed-reduction ratio of the continuously variable transmission 5 and the contact frictional force of the V-belt 12 according to a command signal from a CVT controller 20. Specifically, the oil pressure control unit 100 controls the groove width of the primary pulley 10 and the secondary pulley 11. The CVT controller 20 receives input torque information from an engine control unit 21 which controls the engine 1 and a signal from sensors, described later. Based on the input torque information and signals from the sensors, the CVT controller 20 determines a target speed-reduction ratio and target contact frictional force, and commands the oil pressure control unit 100 to control the speed-reduction ratio and contact frictional force to the target speed-reduction ratio and target contact frictional force, respectively.

The control device comprises an inhibitor switch 23 showing the operating ranges (M1-M6) of the continuously variable transmission in the manual operation mode, a temperature sensor 25 which detects engine water temperature, a rotation speed sensor 26 which detects the rotation speed of the primary pulley 10 as an input speed, a rotation speed sensor 27 which detects the rotation speed of the secondary pulley 11 as an output speed, i.e., the vehicle speed VSP, and a stroke sensor 28 which detects the stroke of an accelerator pedal 24.

The primary pulley 10 of the continuously variable transmission 5 comprises a fixed conical plate 10b which rotates together with the input shaft, and a movable conical plate 10a installed opposite the fixed conical plate 10b so as to form a V-shaped pulley groove. The movable conical plate 10a can be displaced in the axial direction according to an oil pressure (primary pressure) acting on a primary pulley cylinder chamber 10c.

The secondary pulley 11 comprises a fixed conical plate 11b which rotates together with the output shaft 13, and a movable conical plate 11a installed opposite the fixed conical plate 11b so as to form a V-shaped pulley groove. The movable conical plate 11a can be displaced in the axial direction according to an oil pressure (secondary pressure) acting on a secondary pulley cylinder chamber 11c. The primary pulley cylinder chamber 10c and the secondary pulley cylinder chamber 11c have an identical pressure-receiving area which receives pressure.

The drive torque transmitted from the engine 1 is inputted into the continuously variable transmission 5 via the torque converter 2 and the forward/reverse change-over mechanism 4, and is further transmitted to the secondary pulley 11 from the primary pulley 10 via the V-belt 12. Displacing the movable conical plate 10a of the primary pulley 10 and the movable conical plate 11a of the secondary pulley 11 in their respective axial direction changes the contact radius with the V-belt 12. In this way, the speed-reduction ratio between the primary pulley 10 and the secondary pulley 11 can be continuously varied. The oil pressure control unit 100 controls the speed-reduction ratio of the continuously variable transmission 5, and the contact frictional force of the V-belt 12.

Figure 2:
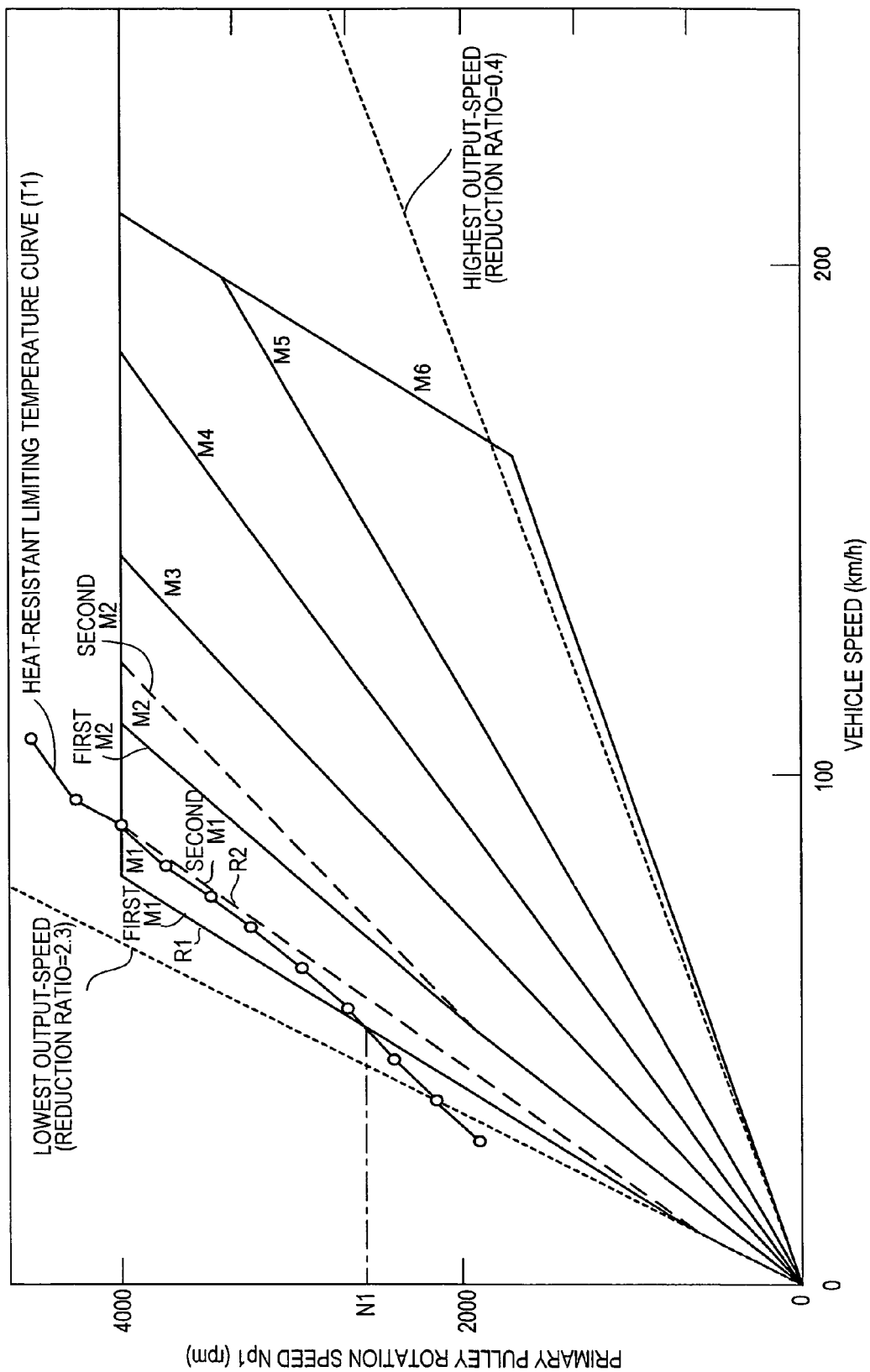
FIG. 2 is a map showing a heat-resistant limiting temperature curve related to a primary pulley rotation speed and a secondary pulley rotation speed (vehicle speed) which give a first predetermined primary pulley rotation speed reached at a first limiting temperature based on a speed-reduction ratio. Also.

FIG. 2 shows typical speed change curves of a V-belt type automatic transmission, and shows speed change curves in a manual mode with 6-shift mode. The speed-reduction ratio (effective radius of secondary pulley/effective radius of primary pulley) can be set within the limits of 2.3 to 0.4. The speed-reduction ratio corresponds to the input/output speed ratio of the continuously variable transmission 5. However, in the region above the heat-resistant limiting temperature curve, use of the speed-reduction ratio on the low-speed side (low output-speed side) is limited from the point of view of the heat-resistant properties of the V-belt 12. On the heat-resistant limiting temperature curve shown in FIG. 2, the V-belt 12 displays a limiting temperature T1 (e.g. 150-170° C.) lower than the heat deterioration temperature T2 (e.g. 170-190° C.) at which heat deterioration (or mechanical property change) of the metal constituting the V-belt 12 occurs. In the prior art control, the speed-reduction ratio is controlled so as not to exceed the heat-resistant limiting temperature curve. For this reason, for example, the speed-reduction ratio in first gear M1 is controlled to a speed-reduction ratio (second M1 line shown by the dashed line) smaller than the usual speed-reduction ratio shown by the solid line (first M1 line). In the range of speed-reduction ratios of the automatic transmission, it is desirable to set the speed-reduction ratio to the lowest-speed side in order to improve the acceleration characteristics in first gear, and in particular the starting accelerating performance. However, the speed-reduction ratio is limited to ensure the heat resistance of the V-belt 12, and the desired starting acceleration performance cannot be attained.

In the control of this invention, as long as the temperature of the V-belt 12 is below the heat deterioration temperature of the V-belt 12, even above the limiting temperature T1 of the V-belt 12, it is considered that there is no effect on the V-belt 12 and the starting acceleration performance of the vehicle is improved.

The control device determines whether or not the temperature of the V-belt 12 is higher than the limiting temperature T1 without measuring the temperature of the V-belt 12. The controller determines the temperature state of the V-belt 12 based on the primary pulley rotation speed Np1 and the speed-reduction ratio referring to a predetermined map (FIG. 2) which defines the relation between the primary pulley rotation speed Np1 and the vehicle speed (secondary pulley rotation speed Np2) at the limiting temperature T1. For this reason, the temperature sensor for detecting the temperature of the V-belt 12 can be omitted, and the temperature determination of the V-belt 12 can be performed with high precision.

Figure 3:
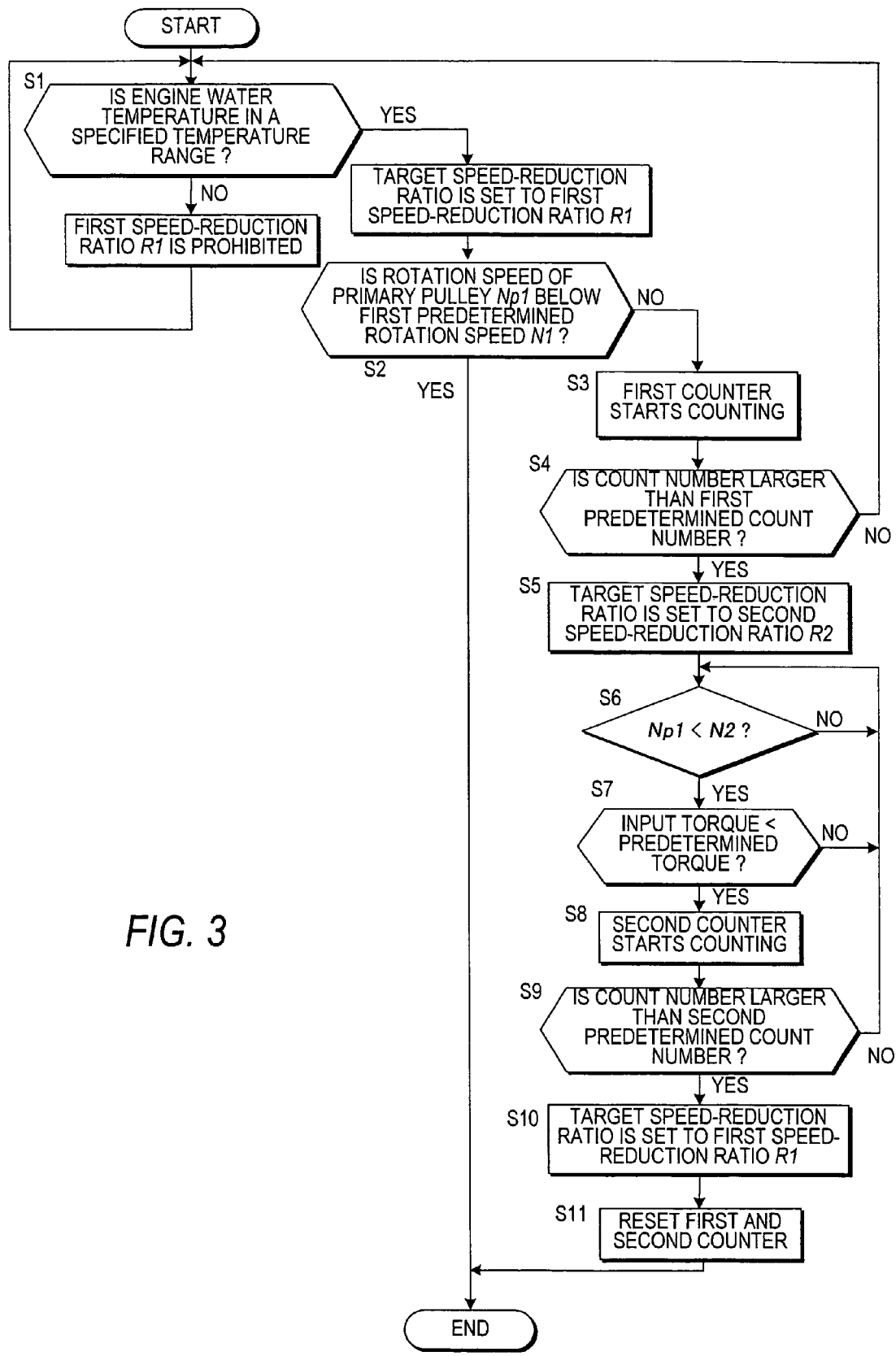
FIG. 3 is a flow chart which shows a control routine of an embodiment.

The control routine of this invention will now be described referring to the flow chart of FIG. 3. The control routine is executed by the CVT controller 20. It may be repeatedly executed. The CVT controller 20 comprises a microcomputer comprising a central processing unit (CPU), read-only memory (ROM), random-access memory (RAM), input/output interface (I/O interface) and a timer.

When control starts in starting the CVT, the target speed-reduction ratio is set as a first speed-reduction ratio R1 (in the figure, speed-reduction ratio for the first M1 line) at which there is a possibility that the temperature of the V-belt 12 will exceed the heat deterioration temperature (second limiting temperature T2).

First, in a step S1, an engine water temperature is detected by using a temperature sensor 25. Next, it is determined whether or not the engine water temperature is in a specified temperature range (e.g., about 110° C.). When the engine water temperature is not within the specified range, use of the first speed-reduction ratio R1, which is on the low-speed side, is prohibited from the start. When the temperature is within the specified range, use of the first speed-reduction ratio R1 is permitted. Subsequently, the routine proceeds to a step S2.

In the step S2, the rotation speed of the primary pulley 10 is detected using a rotation speed sensor 26. Next, it is determined whether or not the detected rotation speed Np1 is below a first predetermined rotation speed N1 (for example, 2500 rpm). Herein, the first predetermined rotation speed N1 is the rotation speed at which the V-belt 12 reaches a first limiting temperature which is lower than the heat deterioration temperature. The first predetermined rotation speed N1 is calculated from the first speed-reduction ratio R1 by referring to a predetermined map (FIG. 2) stored in the memory. The map of FIG. 2 defines the heat-resistant limiting temperature curve on which the V-belt 12 reaches the first limiting temperature, relative to the vehicle speed VSP (secondary pulley rotation speed Np2) and primary pulley rotation speed Np1. In other words, the map shows the relation of the vehicle speed VSP and primary pulley rotation speed Np1 when the V-belt 12 is settled at the first limiting temperature. The map is obtained beforehand by experiment and is stored in a ROM. The intersection of the straight line showing the first speed-reduction ratio R1 and the heat-resistant limiting temperature curve, gives the first predetermined rotation speed N1 of the primary pulley. Thus, the temperature state of the V-belt 12 is determined based on the rotation speed of the primary pulley 10 and the speed-reduction ratio, referring to a map (FIG. 2) which defines the relation between the rotation speed of the primary pulley Np1 and the vehicle speed VSP (secondary pulley rotation speed Np2), at the first limiting temperature.

When the detected rotation speed Np1 is less than the first predetermined rotation speed N1, the routine is terminated. When the detected rotation speed is larger than the first predetermined rotation speed N1, the routine proceeds to a step S3.

In the step S3, to measure a first elapsed time after the detected rotation speed Np1 becomes larger than the first predetermined rotation speed N1, a first counter starts counting. In other words, the time for which the temperature of the V-belt 12 exceeds the first limiting temperature T1 is estimated from the speed-reduction ratio and the rotation speed of the primary pulley 10. The counter may be a timer or an executed code for counting by the microcomputer.

Next, in a step S4, it is determined whether or not the count number has reached a first predetermined count number corresponding to a first predetermined time, for example, 10 seconds. Herein, the first predetermined count number corresponds to the time required for the temperature of the V-belt 12 to reach the heat deterioration temperature (second limiting temperature T2) from the first limiting temperature T1, at the first speed-reduction ratio R1 shown by the first M1 line. When the count number exceeds a first predetermined count number, the routine proceeds to a step S5 to reduce the temperature of the V-belt 12. When the count number is less than the first predetermined count number, the routine returns to the step S1 to maintain the first speed-reduction ratio R1.

In the step S5, as there is a risk that the temperature of the V-belt 12 will reach the heat deterioration temperature, control is performed to decrease the temperature of the V-belt 12. Specifically, the target speed-reduction ratio is changed over to a second speed-reduction ratio R2 (speed-reduction ratio on high-speed side which realizes the second M1 line of the dashed lines in FIG. 2) at which the temperature of the V-belt 12 should decrease to a temperature below the first limiting temperature at all primary pulley rotation speeds which can be realized or permitted (e.g., 0-4000rpm). In other words, use of the speed-reduction ratio on the low-speed side is prohibited.

Next, in a step S6, it is determined whether or not the rotation speed of the primary pulley 10 is less than a second predetermined rotation speed N2 which is substantially equal to the first predetermined rotation speed N1. When the rotation speed of the primary pulley 10 is less than the predetermined rotation speed N2, the routine proceeds to a step S7. When the rotation speed of the primary pulley 10 exceeds the first predetermined rotation speed N2, the rotation speed determination of the step S6 is repeated.

In the step S7, the torque inputted into the continuously variable transmission is computed based on the input torque information from the engine control unit 21. Next, it is determined whether or not the input torque is less than a predetermined torque (for example, 160 Nm). When the input torque is larger than the predetermined torque, the routine returns to the step S6. When the input torque is equal to or less than the predetermined torque, the routine proceeds to a step S8.

In this way, when the rotation speed of the primary pulley is less than the second predetermined rotation speed N2, and the input torque of the primary pulley is less than the predetermined torque, the CVT running state which decreases the temperature of the V-belt has definitely been realized. It should be noted that the steps S6 and S7 are provided as an option, and may be deleted if required.

In a step S8, it is determined that the temperature of the V-belt 12 is falling, and to measure the cooling time of the V-belt 12, the count of a second counter is started.

Next, in a step S9, it is determined whether or not the count number of the second counter has reached a second predetermined count number corresponding to a second predetermined time, e.g., 10 seconds. When the second predetermined count number has been exceeded, the routine proceeds to a step S10, whereas when it has not been exceeded, the routine returns to the step S6. Herein, the second predetermined count number is the count number corresponding to a sufficient time for cooling the V-belt 12 to a temperature lower than the first limiting temperature.

In the step S10, as the temperature of the V-belt 12 is lower than the first limiting temperature, it is permitted that the target speed-reduction ratio is changed over to the first speed-reduction ratio R1 (the speed-reduction ratio on the low-speed side with the first M1 line).

Next, in a step S11, the count numbers of the first and second counters are reset, and the control routine is terminated.

In the above-mentioned embodiment, the case of a manual mode with 6-shift mode was described, but in the case of an ordinary continuously variable transmission (with no manual mode), it may be determined whether or not the temperature of the V-belt 12 reaches the first limiting temperature for every speed-reduction ratio using the map shown in FIG. 2.

In the above-mentioned control, even when the first limiting temperature of the V-belt 12 of the continuously variable transmission is exceeded, the target speed-reduction ratio of the continuously variable transmission is maintained at the first speed-reduction ratio R1 for the first predetermined time. The first predetermined time is a time required for the V-belt 12 to reach a heat deterioration temperature (second limiting temperature T2) higher than the first limiting temperature T1. After the first predetermined time has elapsed, the target speed-reduction ratio is set to the second speed-reduction ratio R2 which is on a higher-speed side than the first speed-reduction ratio R1. In this way, temperature reduction of the V-belt 12 is possible. When the time in which temperature reduction is possible is measured, and this time has reached the second predetermined time, it is determined that the temperature of the V-belt 12 has fallen sufficiently below the first limiting temperature. Therefore, the target speed-reduction ratio is again set to the first speed-reduction ratio R1.

Next, the effect of the aforesaid control will be described. The target speed-reduction ratio is set to the first speed-reduction ratio R1 for the first predetermined time without being limited by the first limiting temperature of the V-belt 12. Therefore, it is possible to use the speed-reduction ratio range of the continuously variable transmission more widely. As the target speed-reduction ratio is the speed-reduction ratio when the continuously variable transmission starts, the starting performance (in particular, starting acceleration performance) of the vehicle can be improved. Further, by limiting the time for which the temperature of the V-belt 12 exceeds the first limiting temperature, control is performed so that the temperature of the V-belt 12 does not exceed the heat deterioration temperature (second limiting temperature T2) of the V-belt 12. The continuously variable transmission to which this invention is applied, can be used in a vehicle carrying a continuously variable transmission, and can improve the acceleration performance of the vehicle.

The entire contents of Japanese Patent Application P2003-340689 (filed Sep. 30, 2003) are incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A control device for controlling a continuously variable transmission, the continuously variable transmission having a primary pulley with a permitted rotation speed region and a secondary pulley with a V-belt looped around the primary and secondary pulleys, the control device comprising:
    an oil pressure control unit which supplies an oil pressure to the primary pulley and secondary pulley based on a command signal indicative of a target speed-reduction ratio,
    a sensor which detects a rotation speed of the primary pulley, and a controller which transmits the command signal indicative of the target speed-reduction ratio to the oil pressure control unit, the controller being programmed to:
   set the target speed-reduction ratio to a first speed-reduction ratio;
   calculate a first predetermined rotation speed of the primary pulley at which the V-belt reaches a first limiting temperature at the first speed-reduction ratio;
   compare the detected rotation speed of the primary pulley with the first predetermined rotation speed;
   calculate a first elapsed time after the detected rotation speed of the primary pulley exceeds the first predetermined rotation speed;
   maintain the first speed-reduction ratio when the first elapsed time is equal to or less than a first predetermined time; and
   set the target speed-reduction ratio to a second speed-reduction ratio smaller than the first speed-reduction ratio when the first elapsed time exceeds the first predetermined time;
   wherein, at the second speed-reduction ratio, the temperature of the V-belt should become equal to or less than the first limiting temperature throughout the permitted rotation speed region of the primary pulley.

2. The control device as defined in claim 1, wherein the first limiting temperature is a temperature lower than a second limiting temperature at which heat deterioration of a metal constituting the V-belt occurs.

3. The control device as defined in claim 2, wherein the first predetermined time is an elapsed time from when the V-belt reaches the first limiting temperature until the V-belt reaches the second limiting temperature.

4. The control device as defined in claim 1, wherein the controller is programmed to:
   measure a second elapsed time after setting the target speed-reduction ratio to the second speed-reduction ratio,
   and when the second elapsed time is larger than a second predetermined time, permit the target speed-reduction ratio to change over to the first speed-reduction ratio.

5. The control device as defined in claim 4, wherein the second predetermined time is a sufficient time for the temperature of the V-belt to become equal to or less than the first limiting temperature.

6. The control device as defined in claim 4, wherein the controller is programmed to measure the second elapsed time only when the rotation speed of the primary pulley is less than a second predetermined rotation speed, and an input torque of the primary pulley is less than a predetermined torque.

7. The control device as defined in claim 1, wherein the first speed-reduction ratio corresponds to a speed-reduction ratio when the continuously variable transmission starts.

8. The control device as defined in claim 1, wherein the controller comprises a map which specifies a relation between the rotation speed of the primary pulley and a rotation speed of the secondary pulley at the first limiting temperature, and the controller is programmed to calculate the first predetermined rotation speed from the first speed-reduction ratio by referring to the map.

9. A control device for controlling a continuously variable transmission, the continuously variable transmission having a primary pulley with a permitted rotation speed region and a secondary pulley with a V-belt looped around the primary and secondary pulleys, the control device comprising:
   supply means for supplying an oil pressure to the primary pulley and secondary pulley based on a command signal indicative of a target speed-reduction ratio,
   detecting means for detecting a rotation speed of the primary pulley,
   transmitting means for transmitting the command signal indicative of the target speed-reduction ratio to the supply means,
   first setting means for setting the target speed-reduction ratio to a first speed-reduction ratio;
   first calculating means for calculating a first predetermined rotation speed of the primary pulley at which the V-belt reaches a first limiting temperature at the first speed-reduction ratio;
   comparing means for comparing the detected rotation speed of the primary pulley with the first predetermined rotation speed;
   second calculating means for calculating a first elapsed time after the detected rotation speed of the primary pulley exceeds the first predetermined rotation speed;
   maintaining means for maintaining the first speed-reduction ratio when the first elapsed time is equal to or less than a first predetermined time; and
   second setting means for setting the target speed-reduction ratio to a second speed-reduction ratio smaller than the first speed-reduction ratio when the first elapsed time exceeds the first predetermined time;
   wherein, at the second speed-reduction ratio, the temperature of the V-belt should become equal to or less than the first limiting temperature throughout the permitted rotation speed region of the primary pulley.

10. A control method for controlling a continuously variable transmission, the continuously variable transmission having a primary pulley with a permitted rotation speed region and a secondary pulley with a V-belt looped around the primary and secondary pulleys, and an oil pressure control unit which supplies an oil pressure to the primary pulley and secondary pulley based on a target speed-reduction ratio, the control method comprising:
   detecting a rotation speed of the primary pulley,
   setting the target speed-reduction ratio to a first speed-reduction ratio;
   calculating a first predetermined rotation speed of the primary pulley at which the V-belt reaches a first limiting temperature at the first speed-reduction ratio;
   comparing the detected rotation speed of the primary pulley with the first predetermined rotation speed;
   calculating a first elapsed time after the detected rotation speed of the primary pulley exceeds the first predetermined rotation speed;
   maintaining the first speed-reduction ratio when the first elapsed time is equal to or less than a first predetermined time; and
   setting the target speed-reduction ratio to a second speed-reduction ratio smaller than the first speed-reduction ratio when the first elapsed time exceeds the first predetermined time;
   wherein, at the second speed-reduction ratio, the temperature of the V-belt should become equal to or less than the first limiting temperature throughout the permitted rotation speed region of the primary pulley.

* * * * *